June 28, 1966   J. FRANCEL ETAL   3,258,521
COATING FOR GLASS AND METHOD OF APPLYING
Filed April 11, 1963
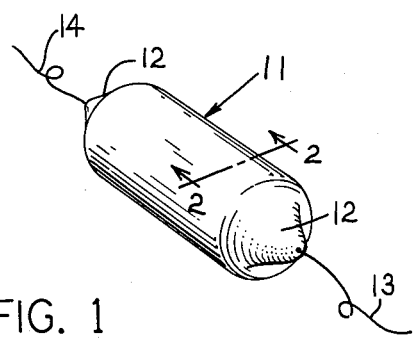
FIG. 1
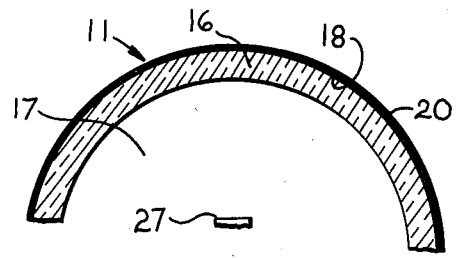
FIG. 2
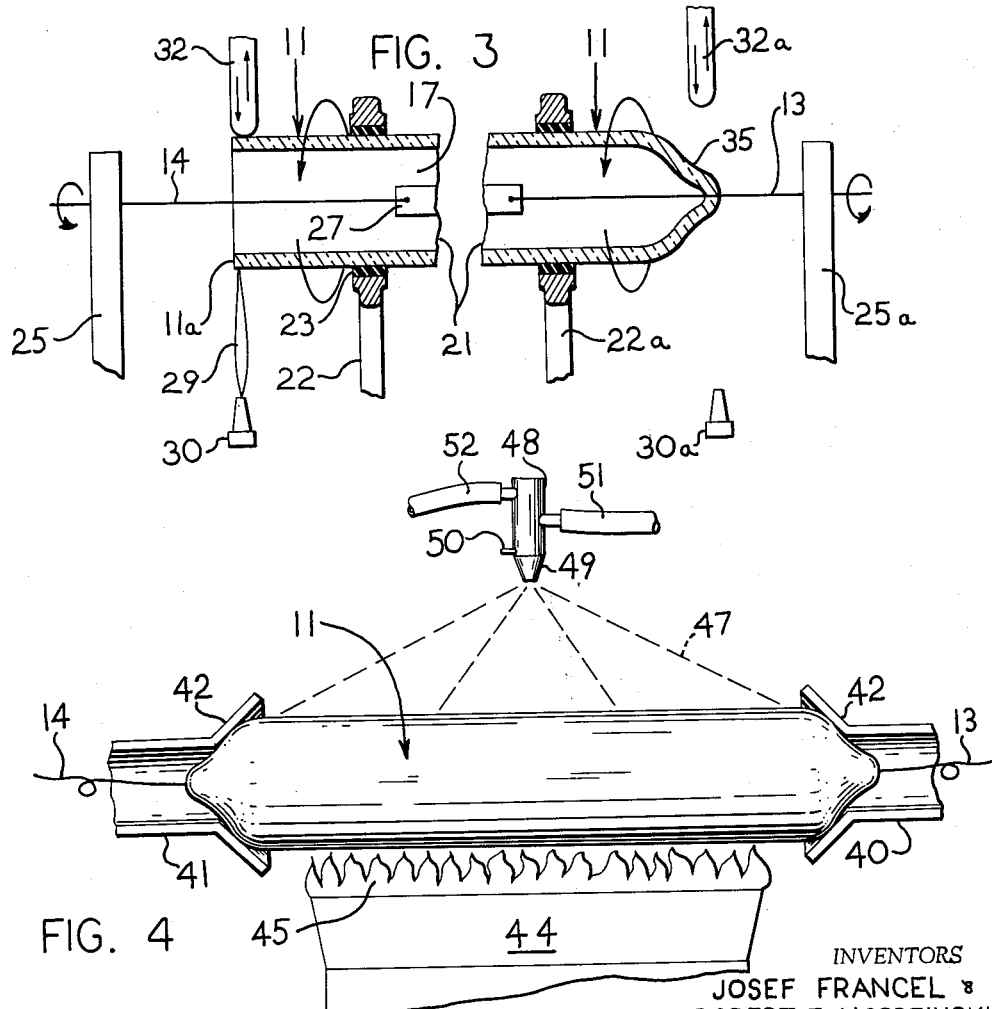
FIG. 3
FIG. 4
INVENTORS
JOSEF FRANCEL &
BY ROBERT F. JAGODZINSKI
ATTORNEYS

United States Patent Office 3,258,521
Patented June 28, 1966

---

3,258,521
COATING FOR GLASS AND METHOD OF APPLYING
Josef Francel and Robert F. Jagodzinski, Toledo, Ohio, assignors to Owens-Illinois, Inc., a corporation of Ohio
Filed Apr. 11, 1963, Ser. No. 272,268
31 Claims. (Cl. 174—52)

The present invention relates generally to the glass art. More particularly, the present invention relates to the treating of previously formed glass articles. Even more particularly, the present invention relates to a coating for glass articles, novel methods of applying the coating and the resulting coated glass article possessing by reason thereof eminently desirable light transmittance characteristics.

It is frequently found desirable to have articles formed of glass treated in an effort to impart certain desired light transmittance characteristics to the glass. One method of imparting particular light transmittance characteristics to a glass article or container is by a so-called "staining" of the glass. Another method of imparting certain light transmittance characteristics to glass is by applying overlying adherent coatings to the glass. In staining glass, silver, copper and combinations of silver and copper salts are applied to the glass, followed by a heat treatment causing an exchange of the copper and/or silver ions with alkali metal ions present in the interstitial voids of the super cooled solution composed of silicon oxide network. In this "staining," the coloring cations, e.g. silver, copper, and the like, actually penetrate into the glass and become a part thereof. Obviously, a "staining" technique cannot be used for glasses which do not contain alkali metal ions in the interstitial voids of the silicon oxide network.

Light transmittance characteristics of a substrate glass can also be modified by the application of coatings. These usually take the form of applied colors, ceramic enamels or frits. These coatings constitute in effect the laying down or securing to the substrate of a "second glass." Difficulty is frequently encountered in the application of these "second glass" coatings in that the substrate glass and the coating of a second glass possess differing coefficients of thermal contraction and expansion. Unless the "second glass" is carefully formulated to have a coefficient of thermal contraction and/or expansion matching that of the substrate glass, the bonding will be impermanent in that when the article is exposed to conditions involving variable temperatures, the difference in either expansion or contraction coefficient will cause a separation of the applied color, ceramic enamel or frit, or induce a point of weakness in the substrate glass. It is also found that these applied colors, frits or ceramic enamels are quite frangible in character, and physical contact of the enamel bearing glass will cause chipping and abrading of the applied color or ceramic enamel, leading to an unacceptable and/or unattractive product.

It is, accordingly, an object of the present invention to provide a universal coating which is capable of being applied to a variety of glasses, both in terms of glasses having a range of composition and glasses having a range of varying coefficient of thermal expansion and/or contraction.

It is also an object of the present invention to provide a coating which is of relatively simple formulation; that is, it is composed of generally readily available constituents combinable with a minimum of difficulty.

It is likewise an object of the present invention to provide such a coating which may be applied to a glass substrate utilizing readily available equipment and techniques.

It is still another object of the present invention to provide such coatings which, when applied, are generally permanent in character and capable of withstanding a generally wide range of temperature exposure and serve additionally to protect the substrate from physical deterioration, either by abrasive, scratching contact or mechanical impact with other like-coated glass articles or other articles normally encountered in the application of the article.

It is yet another object of the present invention to provide a method of coating glass articles which may be practiced in a convenient manner and particularly may be practiced to the end that a uniform permanent coating is applied without the necessity of using elevated temperatures above the annealing temperature of the glass to be coated.

It is another object of the present invention to provide a coated glass article which possesses a particular capability of screening, shielding or absorbing light in the ultraviolet and visible spectrum.

It is a particular object of the present invention to provide a coated glass article in the form of a container, thereby being ideally suited in the production of a receptacle for components having utility in the electronic industry.

It is yet another object of the present invention to provide such a coated container in which the coating has eminently desirable electrical characteristics in that the coating is of high electrical resistance or of low conductivity, whereby the function of the component contained in the coated receptacle is not adversely affected.

It is still another object of the present invention to provide a coating of the type described which, by reason of the choice of ingredients and the proper proportioning thereof coupled additionally with the technique of application, yields a generally film-like coating which is quite thin, coherent and continuous.

It is a particular object of the present invention to provide a cylindrical container formed of glass having a coating of the desired and above-enumerated characteristics, thereby being ideally adapted to enclose and package products, such as electronic components and pharmaceutical products which must be shielded from certain ranges of light; namely, the ultraviolet and visible ranges of the spectrum.

It is yet another object of the present invention to provide a package which is inclusive of an electronic component contained in an insulative and protective glass container bearing a coating having the attribute of absorbing light in the ultraviolet and visible wave length range.

While it will be appreciated from the description of the invention to follow hereinafter that the coating of the invention and the technique of application will have a considerably broad field of application; in the interest of expediency the invention will be described with principal reference to glass containers. Furthermore, the coating and its application to the glass container will be described in terms of a complete and continuous coating over the overall exterior surfaces of the glass container, although it will be appreciated that the coating will find utility as a decorating coating as well; that is, a coating which will be applied to selective areas for the purpose of imparting a design, letters, markings, and the like.

The above-enumerated objects, as well as many others, will become apparent to those skilled in the art from the following detailed description taken in conjunction with the recitation of examples representing preferred embodiments of the present invention; which examples are included in compliance with the patent statutes as to the setting forth of the preferred mode of practicing the invention.

In its simplest and broadest aspect, the present invention envisions a solution-coating for application to a preheated glass substrate, forming an adherent film, the coating including manganous nitrate and one or more of either ammonium nitrate, cupric nitrate and/or ferric nitrate. The solution-coating is conveniently applied to the glass substrate by simply spraying the aqueous solution as a mist or finely-divided droplet, such as may be produced by a variety of commercially available spray guns. The solution-coating is preferably applied by spray application onto the glass substrate after the glass has first been heated up to a temperature of from about 650° F. to about 900° F. (343° C. to 483° C.), which temperature range falls below the annealing temperature of most conventional glasses.

Preferably, the manganous nitrate, $Mn(NO_3)_2$, should be present in the aqueous solution in amounts ranging from about 7.5% to 55% by weight of the water, or from 7.2% to about 35% based on the total weight of the solution. The spray is applied only for a time sufficient to completely cover the surface of the substrate, the article or container. The heat present in the glass by reason of the preheat will instantaneously accomplish vaporization of the water, conversion of the nitrate to manganese oxides and a sintering phenomenon whereby a uniform continuous film of the oxidation products of the solute is formed which is integrally adhered to the glass surface. The resultant film is definitely black in coloration and the transmissibility is essentially zero in the ultraviolet and visible light range of the spectrum, e.g. light having wavelength in the range of from 300 to 700 millimicrons.

It has been additionally determined that the solution-coatings can be improved in terms of their properties, permanence, continuity, homogeneity, adherence and other properties by the inclusion of the aforesaid nitrates, e.g. ammonium, cupric and ferric. Solution-coatings, in accordance with the present invention, are improved by the inclusion of relatively minor amounts of the aforesaid ammonium nitrate, $NH_4NO_3$, in that the conversion of the manganous nitrate to the oxides is expedited presumably by a catalytic effect on the decomposition of the nitrate at the temperature and under the spraying conditions as described. Ammonium nitrate also improves the compaction, or integration as it were, of the final coating. The ammonium nitrate content of the aqueous solution should not exceed 40% based on the total weight of water in the solution-coating, or about 28% based on total solution.

Solution-coatings, in accordance with the present invention, are further improved in terms of the ultimate film by inclusion of cupric nitrate, $Cu(NO_3)_2$. Cupric nitrate as a constituent is found to assist greatly in the formation of a continuous integral film on the glass substrate. Additionally, the cupric nitrate serves in insuring the optimum in adhesion of the sintered coating on the surface of the glass. Lastly, it has been found that the cupric nitrate very appreciably improves the glossiness of the black coloration (the latter being the particular contribution of the manganous nitrate constituent), whereby the effect of the coating is quite visibly dramatic and, therefore, pleasing to the eye. In general, the cupric nitrate content of the aqueous solution should not exceed 55% based on the total weight of the water, or 32% on the basis of the total solution, keeping in mind, however, that the total solute, e.g. nitrate, when more than one is used, should not exceed about 55% on the basis of the weight of water, or about 35% on the basis of the total solution weight.

Ferric nitrate, $Fe(NO_3)_3$, is another ingredient which has been found to be very desirably included in the solution-coating of the present invention. The ferric nitrate improves the uniformity or homogeneity of the ultimate film or coating. Additionally, ferric nitrate improves the adherent character of the composite film. Lastly, the presence of ferric nitrate operates in a very unique fashion in effecting an increase in the electrical resistance of the coating. Stated in another way, it reduces the conductive property of the coating. Exactly why this metallic, and specifically iron compound, should operate to make the coating more resistant to electrical flow is not known and no satisfactory explanation for this phenomenon can be set forth herein. Suffice it to say that this property is eminently desirable in applications wherein the coated glass will be utilized, as in a preferred embodiment of the present invention, as a container or receptacle in forming a packaged electronic component. The ferric nitrate content, where it is included in the solution, should not exceed about 45% based on the total weight of water, or up to 28% based on the total weight of solution, also keeping in mind, however, that the total solute content, e.g. total nitrates, should not exceed about 35% by weight of the total solution weight.

Most ideally, solution-coatings for application to glass, in the manner as described herein, should include selected amounts of all of the aforesaid nitrates. A preferred solution-coating is composed of the following constituents and in the amounts noted.

*Table 1*

Manganous nitrate, $Mn(NO_3)_2$, 50% solution (50 grams of $Mn(NO_3)_2$ in 100 grams of water) _____grams__ 20
Cupric nitrate, $Cu(NO_3)_2$_____do____ 3
Ferric nitrate, $Fe(NO_3)_3$ _____do____ 2
Ammonium nitrate, $NH_4NO_3$ _____do____ 2
Water _____milliliters__ 100

The glass to be coated with the solution-coatings of the present invention may be selected from a variety of conventional and special purpose glasses. Illustrative of the types of glasses and the compositions of the various glasses to which the solution-coatings of the invention will be applied are the glasses which are set forth in terms of analyzed compositions in Table 2.

*Table 2*

| Oxides | Glass A | Glass B | Glass C | Glass D | Glass E |
|---|---|---|---|---|---|
| $SiO_2$ | 49.87 | 58.42 | 80 | 68.0 | 56.0 |
| $B_2O_3$ | 16.50 | | 13 | 1.5 | |
| $Al_2O_3$ | 15.00 | 13.50 | 3 | 3.0 | 2.5 |
| $Na_2O$ | | | 4 | 15.5 | 3.5 |
| $K_2O$ | | | | | 9.0 |
| $Li_2O$ | 3.00 | 2.68 | | | |
| $CaO$ | 8.98 | 14.84 | | 10.0 | |
| $MgO$ | 6.42 | 10.59 | | | |
| $PbO$ | | | | | 29.0 |
| $BaO$ | | | | 2.0 | |
| $F_2/O_2$ | 0.5/0.21 | | | | |
| Total | 100.00 | 100.03 | 100 | 100.0 | 100.0 |

Glass A as revealed by the above specific analysis is representative of an aluminoborosilicate glass of the sealing type and is commonly referred to as such. Glass B is also a metal sealing type glass. The specific analyzed composition is representative of an alumino-silicate glass. Glass C, as revealed by the analysis shown in Table 2, is representative of a low-expansion borosilicate glass. Glass D is a conventional soda-lime-silicate glass having a relatively high-expansion coefficient. Glass E is representative of a lead-silicate glass, likewise having a relatively high coefficient of thermal expansion. The properties of the Glasses A, B, C, D and E are set forth in Table 3 below.

*Table 3*

|  | Glass A | Glass B | Glass C | Glass D | Glass E |
| --- | --- | --- | --- | --- | --- |
| Fiber Soft Point, °C | 709 | 792 | 825 | 700 | 632 |
| Annealing Point, °C | 558 | 625 | 560 | 520 | 433 |
| Expansion × $10^{-7}$/°C. (0–300 °C.) | 51.1 | 61.5 | 32 | 93 | 93 |
| Kovar Seal Temp. (°C.) | 1,100 | 1,200 | (¹) | (¹) | (¹) |

¹ No.

As can be noted from Table 3, the glasses therein are of fairly considerable variance in terms of their composition and as well their thermal expansion coefficients.

It is a particular feature of the present invention that the solution-coatings of the present invention applied preferably by a spraying technique onto the surface or surfaces of glass articles, e.g. containers, at the prescribed preheated temperature range, exhibit the property of yielding a coated glass having essentially zero light transmittance in the visible and ultraviolet range of wavelengths. It is believed that the light transmittance values of essentially zero are caused by the oxidation formation of manganese oxides by the heating of the manganous nitrate. It is further believed that, in addition to manganese oxide, $MnO_2$, there is also present other oxides of manganese, e.g. $Mn_2O_3$ and $Mn_3O_4$. The permanence and durability of the coherent uniform coatings achieved by the practice of the present invention with the solution-coatings as described hereinabove is illustrated by the fact that it has been determined that these coatings as applied and tested were found to be insoluble in nitric acid, phosphoric acid, acetic acid, water, mild alkali and concentrated commercial detergent solutions. Furthermore, the solution-coatings were found to be only slightly soluble in hydrofluoric acid (HF), however it changes in appearance.

A further understanding of the nature of the present invention, its practice and the results achievable thereby will be gained from the following examples.

EXAMPLE I

A glass plate formed of Glass A in Table 2 was utilized in this example, the plate measuring 25 millimeters by 25 millimeters by 2.43 millimeters thickness. The plate was examined utilizing a Cary spectrophotometer model 14. The light transmittance is given in Table 4 hereinbelow. Thereafter, the glass plate is heated up in a hot air furnace to a temperature of 450° C. (842° F.). Thereafter, upon removal from the furnace, the plate is sprayed for a period of about 20 seconds, using a spray gun such as Model #5772SS, manufactured by Spraying Systems Company of Chicago, Illinois, containing a solution of the formulation set forth in Table 1. Many other types of spraying apparatus can be used. The solution forms in small droplets and these seem to disappear upon evaporation by the residual heat in the glass plate and there is formed immediately a solid black coating which is uniform, continuous, glossy and film-like. It dries instantaneously and is resistant to scratching and chipping. The coated plate was then examined for transmittance characteristics in the range from 300 millimicrons to 2600 millimicrons, again using a Cary model 14 spectrophotometer. The light transmittance data for the "coated" and "uncoated" plate are set forth in Table 4. Examination of the data in Table 4 reveals that the uncoated glass plate was capable of transmitting appreciable percentages of the light in the ultraviolet and visible ranges, whereas the sample coated with the solution-coating, in accordance with the preferred technique of the present invention, exhibited zero percent transmittance in the visible and ultraviolet range. Table 4 also reveals that the transmittance of the coated sample, in accordance with Example I, exhibited a peak of 47% transmittance at 2400 millimicrons.

*Table 4*

| Wavelength Millimicrons | Plate Uncoated | Plate Coated |
| --- | --- | --- |
| 300 | 1 | 0 |
| 350 | 72 | 0 |
| 400 | 89 | 0 |
| 500 | 90 | 0 |
| 600 | 90 | 0 |
| 700 | 90 | 0 |
| 800 | 87 | 0 |
| 900 | 89 | 0 |
| 1,000 | 88 | 2 |
| 1,100 | 88 | 4 |
| 1,500 | 89 | 24 |
| 2,000 | 89 | 41 |
| 2,200 | 85 | 43 |
| 2,400 | 83 | 47 |
| 2,500 | 81 | 46 |
| 2,600 | 77 | 46 |

EXAMPLE II

A glass plate formed of Glass C in Table 2 measuring 25 millimeters by 25 millimeters by 2 millimeters was used in this example. The plate was heated up in an electrical furnace to a temperature of 480° C. The plate was removed and immediately a solution-coating having the formulation set forth in Table 5 was sprayed thereon.

*Table 5*

| | |
| --- | --- |
| Manganous nitrate (50% by weight solution) grams | 20 |
| Cupric nitrate do | 45 |
| Ferric nitrate do | 2 |
| Ammonium nitrate do | 2 |
| Water milliliters | 100 |

The spraying was accomplished in the same manner as in Example I and a complete coverage of the plate was obtained in about 20 seconds. The coating dried immediately to a non-tacky state. The transmittance characteristics of the plate of glass (Glass C) was determined both on the plate as uncoated and after coating as just described. The results are shown in Table 6 below from which it can be seen that the uncoated plate exhibited substantial transmittance of light in the visible and ultraviolet range, while the plate coated in accordance with this example with the solution-coating set forth in Table 5 effectively screened or absorbed light in the ultraviolet and visible range. The coated glass plate in accordance with this example exhibited an ultimate peak in transmissibility of 2.3 microns or 2300 millimicrons and amounted to 51%. The coated plate on examination revealed the coating to have the attributes of a film. It firmly adhered to the plate and it resisted scratching with the fingernail.

Table 6

| Wavelength Millimicrons | Plate Uncoated | Plate Coated |
| --- | --- | --- |
| 300 | 30 | 0 |
| 350 | 91 | 0 |
| 400 | 92 | 0 |
| 500 | 92 | 0 |
| 600 | 92 | 0 |
| 700 | 92 | 0 |
| 800 | 91 | 1 |
| 900 | 91 | 3 |
| 1,000 | 91 | 6 |
| 1,100 | 91 | 11 |
| 1,500 | 91 | 32 |
| 2,000 | 91 | 47 |
| 2,200 | 90 | 47 |
| 2,400 | 87 | 50 |
| 2,500 | 86 | 49 |
| 2,600 | 84 | 48 |

EXAMPLE III

In this example a glass plate, 2 millimeters thick and of the same dimensions as in Example II, was utilized. However, the glass plate was formed of a Glass D having the analyzed composition set forth in Table 2 and the properties set forth in Table 3. A solution-coating was utilized in this example having the composition set forth in Table 7 below.

Table 7

Manganous nitrate (50% by weight solution)

| | |
| --- | --- |
| Cupric nitrate | grams__ 50 |
| Ferric nitrate | do____ 1 |
| Ammonium nitrate | do____ 8 |
| Water | do____ 2 |
| | milliliters__ 100 |

This plate was preheated to 360° C. and thereafter immediately sprayed with the solution of the composition given in Table 7. Transmittance values were determined, using the Cary model 14 spectrophotometer as before, both for the sample of glass plate as uncoated and as coated as described. The coating, upon application, immediately converted to a solid, black, continuous film which was firmly adherent to the glass surface. The transmittance data is given in Table 8 just immediately following, in which it can be seen that the uncoated plate exhibited substantial light transmittance, while the coated plate screened out or absorbed effectively the ultraviolet and visible light. A transmittance peak was observed at 2350 millimicrons, amounting to 51%.

Table 8

| Wavelength Millimicrons | Plate Uncoated | Plate Coated |
| --- | --- | --- |
| 300 | 1 | 0 |
| 350 | 75 | 0 |
| 400 | 90 | 0 |
| 500 | 90 | 0 |
| 600 | 91 | 0 |
| 700 | 91 | 0 |
| 800 | 91 | 0 |
| 900 | 91 | 3 |
| 1,000 | 91 | 6 |
| 1,100 | 91 | 11 |
| 1,500 | 91 | 31 |
| 2,000 | 91 | 46 |
| 2,200 | 90 | 48 |
| 2,400 | 87 | 50 |
| 2,500 | 85 | 50 |
| 2,600 | 82 | 49 |

The coated plates of the preceding Examples I, II and III were measured and the film coatings were found to fall within the range of 0.1 to 4 microns in thickness. The film coatings were also subjected to elevated temperatures and it was found that the coatings were resistant to temperatures ranging up to 635° C. (1175° F.). Coatings of varnish and pigmented paints, if subjected to such temperatures, would actually burn off or at least crack, demonstrating decomposition.

As indicated hereinabove, the solution-coatings of the invention should be aqueous solutions containing most preferably not more than 40% of total nitrate based on total solution. Larger proportions of total nitrate are undesirable because the properties of the coating become unsuitable for the desired end use. Furthermore, incoherent films which indicate interrupted areas are formed. The amount of total nitrate should constitute at least 7.5% by weight of total solution; at which minimum level the manganous nitrate should be present in definite preponderance over the other nitrates if present. Lower nitrate contents do not yield continuous film-like layers possessive of the desired light transmittance. Amounts under 7.5% are also undesirable since complete visible cut-out is not obtained and only partial light absorption results. It is to be understood that manganous nitrate is the most important single ingredient of the solution-coatings of the present invention. Ammonium nitrate is the next most important nitrate functioning as a modifying ingredient giving the improvements noted hereinabove. When cupric and ferric nitrates are included, the optimum in film-like character and light screening properties is achieved.

Where the film-coated glass is to be used in an application involving utilization of electricity, it has been determined that the total nitrate or solute should be maintained at a level below about 40% based on the total weight of solution. Additionally, for such applications the solution-coating to be applied to the glass should include, in addition to the manganous nitrate, an amount of ferric nitrate and preferably, in addition, a minor amount of ammonium nitrate.

In a preferred embodiment of the present invention, miniature sized vials and/or tubing blanks formed of glass are utilized as a primary encapsulating container for electronic components, such as transistors, silicon rectifiers, diodes, triodes, carbon resistors, and the like. Glass makes a very desirable encapsulating container because it is a non-conductor, can be formed to close tolerance and is transparent, permitting visual inspection at least until treated in accordance with this invention.

Electronic components and other items of certain types are deleteriously affected by exposure to light in the visible and ultraviolet range of wavelengths. Accordingly, these components must be shielded so that they may continue to function, in the particular apparatus or assembly of which they are a functional part, as long as possible. A long life is an extremely desirable characteristic of electornic components which are a part of extremely sophisticated circuitry involved in communication to and control of space probes, satellites, and the like. In accordance with the present invention, provision for shielding the electronic components from damaging light rays are set forth briefly as follows. First, electronic components are located within appropriately miniature sized glass tubing or vials usually with electrical lead wires extending from the end of, for example, a small length of glass tubing. The ends of the glass cylinder can then be fusion sealed, care being taken that the component itself is not allowed to overheat. Next, the entire encapsulated receptacle is preheated to the temperature range of from 343° C. to 483° C. (650° F. to 900° F.). Thereafter, a solution-coating composition as described hereinabove is applied, preferably by spraying, since uniformity and control of thickness is better assured. The coating dries immediately to form an essentially black, integrated and continuous film adherently secured to the outer surface. The film-coated vial provides an effective shield against transmission of ultraviolet and visible light therethrough, whereby degradation and consequent short life is avoided. Since the encapsulated component is visible through the wall of the glass tubing until the spray application of the solution commences, inspection and rejection of defective units can be conveniently scheduled up to that point.

Many other techniques require coating of the glass before insertion of the electronic component so that later visual inspection is impossible.

Since the invention has been generally described with reference to the packaging or encapsulating of electronic components in a section of tubing of glass, an illustration and more specific disclosure of preferred techniques will follow. Reference, accordingly, may be had to the annexed sheet of drawings on which there is presented, for purposes of illustration only, several embodiments including techniques for practicing the present invention and ultimate products.

In the drawings:

FIG. 1 is a perspective view of a length of coated and sealed tubing having electrical lead wires extending from each end and connecting with a component within (not shown).

FIG. 2 is a sectional view, slightly enlarged, taken on the line 2—2 of FIG. 1.

FIG. 3 is a sectional view of a piece of glass tubing, the center portion being broken away, and serving to illustrate schematically the sealing of the glass tubing.

FIG. 4 is a side elevation view of the length of sealed glass tubing undergoing heating and spraying in sequence.

Referring now immediately to the drawings, there is disclosed in FIGS. 1 and 2 a length of hollow glass tubing 11. The previously open ends of the tubing 11 have been sealed as at 12 by the application of a localized source, such as a flame or infrared rays. Projecting from each end of the tubing are, respectively, lead wires 13 and 14 which connect interiorly with an electronic component (not shown) of the type hereinbefore mentioned. The formation of the tubing plays no part in the practice of the present invention and will not be discussed herein in detail. Methods of forming multiple containers from glass tubing are, of course, well understood as, for example, reference may be had to Dichter Patent No. 2,935,819 for appropriate apparatus and methods for so producing. Although not shown, it will be appreciated that packing or spacers of various sorts and types may be employed to suspend the electronic component within the cylindrical tubing so that it does not become damaged by vibration, shock or the like encountered in the ultimate application of the cylindrical receptacle 11.

The cylindrical tubing 11 includes an annular wall 16 which surrounds the generally hollow interior 17. The outer surface 18 of the annular wall 16 has adherently attached thereto a layer or coating 20. This layer or coating is continuous, film-like and adherent, as has been described hereinabove. It is composed principally of the products of oxidation of a previously applied solution-coating of manganous nitrate and including other nitrates in accordance with the preferred embodiment of the present invention. The light transmittance of these film-like coatings has been previously discussed in considerable detail in the specific examples.

Referring now to FIG. 3, there is illustrated an intermediate step in the production of the sealed and coated cylindrical glass tubing 11 shown in FIG. 1. In this figure the tubing 11 is broken away, as at 21, for simplicity of description. The tubing is held firmly in a rotatable chuck member 22 by glass contacting resilient pads 23 for axial rotation about the principal axis of the cylinder 11. Similarly, the lead wire 13, extending outwardly at the left from the electronic component 27, is held in a chuck member 25 which is controlled to rotate at the same speed as the chuck 22 so that the tubing and electronic component will maintain their same relative position. The left lip 11a of the tubing 11 has impinging thereon a flame 29 issuing from a nozzle 30. The flame serves to soften up the entire annular lip 11a of the tubing 11 as the tubing rotates. Also contacting the end of the tubing 11 is a forming tool 32, which is adapted to move inwardly and outwardly, as illustrated by the arrows, so that the heat-softened end 11a may be urged inwardly to form the heat or fusion seal about the lead wire 13. On the right hand side of the construction shown in FIG. 3, the completely heat fused and sealed end is identified by the reference numeral 35. The lead wire 13 is still held in the chuck 25a while the body proper of the tubing 11 is held by the chuck 22a. The nozzle 30a has been shut off so that no flame is impinging on the lip portion and the forming tool 32a has been moved upwardly out of contact with the lip portion. When both ends of the tubing have been sealed, rotation ceases and the assembly is inspected for defects as to the quality of the seal, the location of the electronic component or as to the electronic component itself.

Reference may be now had to FIG. 4. The assembly 11 is shown suspended between rotatable end chucks 40 and 41 which are hollow to permit passage of the lead wires 13 and 14 therethrough. The flange portions 42 of the chucks permit a minimal contact engagement with the end portions of the tubing. The chucks are rotated in the same direction by any suitable drive arrangement (not shown), while at the same time a burner 44 is controlled to cause a flame 45 to play on the surface of the glass to accomplish preheating of the entire outer surface of the glass cylinder or tubing 11. Infrared heating elements may be used in place of the flame, of course. The preheating is continued until the glass surface measures between 650° F. and 900° F. (343° C. to 483° C.), as referred to earlier herein, whereupon the flame is discontinued. Immediately, the surface of the glass is contacted by a spray 47 composed of an aqueous solution of manganous nitrate together with one or more of the other nitrates as described hereinbefore. The spray solution issues as fine droplets from a nozzle 48 having a spray end 49 controlled by knob 50. The solution nozzle is provided with an inlet 51 for the aqueous solution and an inlet 52 for spray air. The spray 47 is continued until the surface has been completely covered with a layer of the solution-coating described hereinabove. The temperature of the tubing 11 induced by the preheating as described will be found sufficient to immediately vaporize the moisture from the spray coating and at the same time accomplish the sintering and oxidizing of the solute portion of the solution-coating. As a consequence, the coating will dry immediately to the touch and the assembly 11 may be removed from the chucks. It will be observed that the coating is a jet black in color and possesses a definite sheen or shining glossy appearance. The coating serves to physically protect the glass surface from physical damage, e.g. cracking or scratching, and additionally screens out or absorbs light in the infrared and visible range of wavelength. As a consequence, the electronic component (not shown in FIG. 4) will be, first of all, atmospherically isolated from the exterior conditions and, in addition, isolated from light in the visible and infrared regions which exist exteriorly and to which the component may be subjected in its environmental application.

It is a salient feature of the present invention that the coating as described hereinabove may be applied to a wide range of glass compositions, varying in terms of their physical properties, e.g. annealing temperatures, coefficient of thermal expansion and contraction, and likewise varying as to their actual composition as determined by choice and amount of batch ingredients.

The application of the solution-coatings of the present invention has been found to be most conveniently accomplished by an atomizing or spraying operation and such is preferred as disclosed in the above description and illustrated in the accompanying drawings. It is appreciated and envisioned, however, that dipping, brushing and roller coating may be utilized to apply manganese compounds formulated in the form of more viscous fluids.

An important aspect of the present invention lies in the providing of an encapsulated electronic component including a glass envelope having enclosed therewithin the electronic component, the envelope being sealed from the environmental atmosphere excepting for electrical lead wires extending exteriorly therebeyond, said envelope bearing an adherent coating in the form of a film composed chiefly of the oxidation products of a manganese compound and, preferably, manganous nitrate in combination with the several other nitrates as described hereinabove; to the end that the encapsulated assembly has a light transmittance of essentially zero in the ultraviolet and visible range of the spectrum.

From the foregoing description, it will be appreciated that obvious substitutions and equivalence of materials and techniques may be employed without departing from the essential spirit of the invention, and accordingly it is intended to include all such obviously suggested modifications unless specifically delimited by the appended claims.

We claim:

1. A solution-coating capable of forming a continuous film on glass surfaces to lower the light transmittance characteristics thereof, said coating comprising an aqueous solution of manganous and ammonium nitrates, in which solution, manganous nitrate predominates and the total nitrate content falls within the range of from 7.5% to 40% by weight of the total solution.

2. A solution-coating as claimed in claim 1, wherein said solution includes a minor amount of cupric nitrate.

3. A solution-coating as claimed in claim 1, wherein said solution includes a minor amount of ferric nitrate.

4. A solution-coating as claimed in claim 2, wherein said solution includes a minor amount of ferric nitrate.

5. The method of treating a transparent, rigid, glass substrate to impart light-absorbing properties thereto, which comprises preheating said substrate to a temperature below the softening temperature but within the range of from about 650° F. to about 900° F., applying a heat decomposable manganese nitrate compound to said substrate surface and allowing the preheat to form an adherent film of the oxidation products of the manganese nitrate on said surface, whereby said treated substrate possesses a light transmittance of essentially zero in the ultraviolet and visible ranges of the spectrum.

6. The method of treating a transparent, rigid, glass substrate to impart light-absorbing properties thereto, which comprises preheating said substrate to a temperature below the softening temperature but within the range of from about 650° F. to about 900° F., applying aqueous solution of manganous nitrate to said substrate surface and allowing the preheat to vaporize the moisture and form an adherent film of the oxidation products of the solute on said surface, whereby said treated substrate possesses a light transmittance of essentially zero in the ultraviolet and visible ranges of the spectrum.

7. The method as claimed in claim 6, wherein said solution includes ammonium nitrate.

8. The method as claimed in claim 7, wherein said solution includes cupric nitrate.

9. The method as claimed in claim 8, wherein said solution includes ferric nitrate.

10. A method of treating glass to impart light-absorbing properties thereto, which comprises adjusting the temperature of said glass to a temperature just below the annealing temperature, immediately applying manganese nitrate which is oxidizable by said heat onto the glass surface and allowing the heat emanating from said glass to form an adherent film of the oxidation products of said nitrate on said glass.

11. A method of treating glass to impart light-absorbing properties thereto, which comprises heating said glass to a temperature just below the annealing temperature, immediately applying manganous nitrate onto the glass surface and allowing the heat emanating from said glass to form an adherent film of the oxidation products of manganous nitrate on said glass.

12. A method of treating glass to impart light-absorbing properties thereto, which comprises heating said glass to a temperature just below the annealing temperature, immediately spray applying an aqueous solution of manganous nitrate onto the glass surface and allowing the heat emanating from said glass to vaporize the moisture of said solution and form an adherent film of the oxidation products of the solute on said glass, said film bearing glass possessing a light transmittance of essentially zero in the ultraviolet and visible ranges of the spectrum.

13. The method as claimed in claim 11, wherein the solution includes amounts of ferric nitrate, cupric nitrate and ammonium nitrate, the total of said nitrates falling within 7.5 to 40.0 by weight of total solution.

14. The method of packing an article sensitive to light in the ultraviolet and visible range of the spectrum, said method comprising locating said article within a container formed of a glass, sealing said container, heating the outer surface of said container to a temperature just below the annealing temperature and immediately applying to said heated surface a manganese compound which is capable of being oxidized by the heat induced by said temperature and yieldative of an oxidation product adherent to said surface as a non-tacky continuous film characterized by a light transmittance of zero in the ultraviolet and visible range of the spectrum.

15. The method of packaging an article sensitive to light in the ultraviolet and visible range of the spectrum, said method comprising locating said article within a container formed of a glass, sealing said container, heating the outer surface of said container to a temperature just below the annealing temperature and immediately applying to said heated surface a solution of manganous nitrate.

16. The method as claimed in claim 15, wherein said solution includes ammonium nitrate.

17. The method as claimed in claim 16, wherein said solution includes cupric nitrate.

18. The method as claimed in claim 17, wherein said solution includes ferric nitrate.

19. The method of packaging an article sensitive to light in the ultraviolet and visible range of the spectrum, said method comprising locating said article within a container formed of a glass, sealing said container, heating the outer surface of said container to a temperature just below the annealing temperature and immediately applying to said heated surface a solution of manganous nitrate to thereby form in situ an adherent, continuous, non-tacky film characterized by a light transmittance of zero in the ultraviolet and visible range of the spectrum.

20. A glass article inclusive of a surface and a film-like coating adhesively carried by said surface, said coating comprising oxidation products of manganese nitrate.

21. A glass article inclusive of a surface and a film-like coating adhesively carried by said surface, said coating comprising the oxidation products of manganous nitrate resulting from exposure to a temperature in the range of from 650° F. to 900° F.

22. A glass article inclusive of a surface and a film-like coating adhesively carried by said surface, said coating comprising products resulting from the heat oxidation of an aqueous solution of manganous nitrate.

23. An article as claimed in claim 22, wherein said aqueous solution includes ammonium nitrate.

24. An article as claimed in claim 23, wherein said aqueous solution includes cupric nitrate.

25. An article as claimed in claim 24, wherein said aqueous solution includes ferric nitrate.

26. In combination, a glass envelope serving as a receptacle, an electrical component located within said receptacle in sealed relationship whereby said component is atmospherically isolated from conditions existing exteriorly, and a coating adherently carried by the outer surface of said envelope, said coating comprising a film-like layer composed of products of oxidation of manganese nitrate.

27. In combination, a glass envelope serving as a receptacle, an electrical component located within said receptacle and having electrical contact means leading externally of said envelope, said envelope being otherwise sealed whereby said component is atmospherically isolated from conditions existing exteriorly, and a coating adherently carried by the outer surface of said envelope, said coating comprising a film-like layer including principally oxidation products of manganous nitrate, said coating imparting to the envelope a light transmittance of essentially zero in the ultraviolet and visible range of the spectrum.

28. The combination of claim 27, wherein said products include oxidation products of ammonium nitrate.

29. The combination of claim 28, wherein said products include oxidation products of cupric nitrate.

30. The combination of claim 29, wherein said products include oxidation products of ferric nitrate.

31. In combination, a glass envelope serving as a receptacle, an electrical component located within said receptacle and having electrical contact means leading externally of said envelope, said envelope being otherwise sealed whereby said component is atmospherically isolated from conditions existing exteriorly, and a coating adherently carried by the outer surface of said envelope, said coating comprising a film-like layer constituting oxidation products of manganous nitrate and ammonium nitrate, said coating imparting to the envelope a light transmittance of essentially zero in the ultraviolet and visible range of the spectrum.

References Cited by the Examiner

UNITED STATES PATENTS

| | | | |
|---|---|---|---|
| Re. 21,823 | 6/1941 | Burns | 313—221 X |
| 2,264,244 | 11/1941 | Lytle | 65—60 X |
| 2,401,537 | 6/1946 | Adams | 117—54 |
| 2,424,454 | 7/1947 | Gordon | 313—112 X |
| 2,691,323 | 10/1954 | Raymond | 117—54 X |
| 2,795,084 | 6/1957 | Littleton | 117—124 |

FOREIGN PATENTS

| | | |
|---|---|---|
| 2,900 | 1805 | Great Britain. |
| 6,612 | 1893 | Great Britain. |
| 867,781 | 4/1961 | Great Britain. |

ROBERT K. SCHAEFER, *Primary Examiner.*

DARRELL L. CLAY, *Examiner.*

W. B. FREDRICKS, *Assistant Examiner.*